(12) United States Patent
Schaefer et al.

(10) Patent No.: US 11,987,023 B2
(45) Date of Patent: May 21, 2024

(54) METHOD FOR PRODUCING A COMPOSITE MATERIAL AND COMPOSITE MATERIAL

(71) Applicant: Konrad Hornschuch AG, Weissbach (DE)

(72) Inventors: Philipp Schaefer, Hannover (DE); Birgit Kammerer, Kupferzell (DE)

(73) Assignee: Konrad Hornschuch AG, Weisshach (DE)

( * ) Notice: Subject to any disclaimer, the term of this patent is extended or adjusted under 35 U.S.C. 154(b) by 556 days.

(21) Appl. No.: 15/779,113

(22) PCT Filed: Nov. 2, 2016

(86) PCT No.: PCT/EP2016/076338
§ 371 (c)(1),
(2) Date: May 25, 2018

(87) PCT Pub. No.: WO2017/089081
PCT Pub. Date: Jun. 1, 2017

(65) Prior Publication Data
US 2018/0345634 A1    Dec. 6, 2018

(30) Foreign Application Priority Data

Nov. 27, 2015 (AT) .............................. A 51019/2015

(51) Int. Cl.
*B32B 3/24* (2006.01)
*B32B 3/26* (2006.01)
(Continued)

(52) U.S. Cl.
CPC .............. *B32B 27/08* (2013.01); *B32B 3/263* (2013.01); *B32B 3/266* (2013.01); *B32B 5/022* (2013.01);
(Continued)

(58) Field of Classification Search
CPC ........................ B32B 3/266; Y10T 428/24331
See application file for complete search history.

(56) References Cited

U.S. PATENT DOCUMENTS 6,423,399 B1    7/2002    Endo et al.
6,633,019 B1    10/2003   Gray
(Continued)

FOREIGN PATENT DOCUMENTS

DE    102006016638 A1    10/2007
DE    202008004906 U1    6/2008
(Continued)

*Primary Examiner* — William P Watkins, III
(74) *Attorney, Agent, or Firm* — Richard A. Wolf; Gregory J. Adams

(57) ABSTRACT

The invention relates to a process for the production of a composite material, by bonding a supportive layer to an upper layer (1) made of polyurethane or flexible PVC, where the supportive layer (2) is a textile material, e.g. woven fabric, knitted fabric or nonwoven microfiber fabric, or a leather, in particular a split cowhide leather, and the upper layer (1) comprises, bonded to one another, a number of polyurethane layers or a number of flexible PVC layers (1', 1"). The invention provides that
   in the composite of upper layer (1) and supportive layer (2), proceeding from the surface of the upper layer (1), channel-shaped cavities (6) for the passage of water vapor and/or air are formed via ablation of material by a laser in a manner such that
   at least some of the cavities (6) penetrate the entire thickness of the material of the upper layer (1) and/or terminate before entry into that region of the volume of the supportive layer (2) that is free from the material of the upper layer (1).

26 Claims, 2 Drawing Sheets

(51) Int. Cl.
    *B32B 5/02*     (2006.01)
    *B32B 5/18*     (2006.01)
    *B32B 5/24*     (2006.01)
    *B32B 7/12*     (2006.01)
    *B32B 9/02*     (2006.01)
    *B32B 9/04*     (2006.01)
    *B32B 27/08*    (2006.01)
    *B32B 27/30*    (2006.01)
    *B32B 27/40*    (2006.01)
    *B60N 2/00*     (2006.01)
    *B60N 2/58*     (2006.01)

(52) U.S. Cl.
    CPC .............. *B32B 5/024* (2013.01); *B32B 5/026* (2013.01); *B32B 5/18* (2013.01); *B32B 5/245* (2013.01); *B32B 7/12* (2013.01); *B32B 9/025* (2013.01); *B32B 9/046* (2013.01); *B32B 9/047* (2013.01); *B32B 27/304* (2013.01); *B32B 27/40* (2013.01); *B60N 2/00* (2013.01); *B60N 2/58* (2013.01); *B60N 2/5891* (2013.01); *B32B 2266/0278* (2013.01); *B32B 2307/4026* (2013.01); *B32B 2601/00* (2013.01); *B60N 2205/30* (2013.01); *Y10T 428/24331* (2015.01)

(56) References Cited

U.S. PATENT DOCUMENTS

| | | |
|---|---|---|
| 2003/0105219 A1 | 6/2003 | Schutze et al. |
| 2006/0024476 A1 | 2/2006 | Leland et al. |
| 2007/0249746 A1 | 10/2007 | Rische et al. |
| 2009/0311480 A1* | 12/2009 | Fischer .................. D06N 3/145 264/293 |
| 2010/0263235 A1 | 10/2010 | Schaefer |
| 2010/0272955 A1* | 10/2010 | Chimelak ................. B32B 5/18 428/138 |
| 2013/0086781 A1* | 4/2013 | Eagles .................. D21F 1/0081 28/104 |
| 2013/0316141 A1* | 11/2013 | Kammerer ............ B32B 27/065 156/247 |
| 2017/0305126 A1* | 10/2017 | Takeshita ............. B32B 27/365 |

FOREIGN PATENT DOCUMENTS

| | | |
|---|---|---|
| WO | 02090413 A1 | 11/2002 |
| WO | 2009049728 A2 | 4/2009 |

* cited by examiner

METHOD FOR PRODUCING A COMPOSITE MATERIAL AND COMPOSITE MATERIAL

The invention relates to a process for the production of a composite material as in the preamble of claim 1. The invention further relates to a composite material, and also to articles, in particular cut-to-size sections, which have been produced from, or cut to size from, said composite material and in particular are used for seat coverings and, respectively, trim parts for motor vehicles.

Composite materials and cut-to-size sections produced therefrom, in particular of the type produced and used for motor vehicles, shoes and treatment couches, are intended to have adequate permeability to air and/or water vapor. Methods currently used to provide cavities to composite materials of this type for the passage of air and/or water vapor are punching and needling. Production by punching is complicated, and it is difficult to form small cavities or passage openings. When passage openings are produced by needling, in contrast to punching, they leave the supportive material undamaged; however, the resultant passage openings have a tendency to reclose.

When hot needles are used, which provide permanent perforation of the plastics upper layer of the composite material, crusts form at the edges, and the surface of the composite material therefore becomes rough, and its haptic properties are therefore impaired.

Furthermore, the punches or needling rolls used to form passage openings are always capable only of producing the same stereotypical arrangement and shape of the passage openings. It is not possible to achieve variation or to form a pattern or to form perforations of differing depth. The resultant shape and size is always the same, as also is the distribution on the composite materials produced in webs or sheets. The webs or sheets are divided or chopped into cut-to-size sections only after formation of the cavities or passage openings.

Material for the production of the composite material is an at least two-ply upper layer made of polyurethane or flexible PVC, bonded to a supportive layer. A composite material of this type can by way of example also be a commercially available or known synthetic leather available in the form of web product that is processed to give cut-to-size sections. The composition of the polyurethane or PVC used for the upper layer can vary, depending on intended purpose. The same also applies to the supportive layer, for which there is a wide variety of available materials.

Production of the composite material, or of the composite of upper layer and supportive layer, or of a synthetic leather, is achieved in a manner known per se. If appropriate, the upper layer produced on a release paper is directly bonded to the supportive layer, or an optionally foamed middle layer made of flexible PVC or optionally of foamed polyurethane is used to bond the upper layer and the supportive layer. The middle layer can also be a prepolymer or a high-solids PU, which harden in situ. In another possibility, the carrier is placed onto the upper layer, which has not yet fully completed its reaction, or to which a lamination paste has been provided, and the materials are bonded to one another by virtue of the pressure resulting from the weight of the supportive layer.

With the aim of eliminating the disadvantages of the composite materials hitherto provided with cavities or passage openings for air and/or water vapor, the invention provides that the cavities and passage openings are produced by a laser, or that the material required for the formation of the cavities is removed by laser ablation. By virtue of ablation with the aid of a laser, the position and depth of the cavities can be precisely determined.

In an advantageous possibility, in particular in the case of an uneven or grained or embossed surface, at least 50% of the cavities formed penetrate the entire thickness of the upper layer and extend at least as far as the supportive layer.

For durability and strength, the upper layer advantageously comprises, in contact with one another and/or following one another, flexible PVC layers or polyurethane layers where, during the formation of the cavities, the individual layers of the upper layer are bonded or, respectively, fused to one another by the laser in the region surrounding the cavities.

Good strength properties and good usage properties are obtained when the composite material is produced with a thickness of from 1.0 to 1.4 mm and/or if the upper layer and the middle layer are formed with a overall total thickness of from 0.080 to 0.950 mm, preferably with a total thickness of from 0.010 to 0.750 mm.

Within the scope provided by the control of the laser, it is possible to achieve wide variation of the arrangement and the shape of the cavities. The number of possible designs is increased if pigments of different colors are added to the upper layer and/or to the individual layers of the upper layer and/or the middle layer.

For the production of the composite material, the upper layer is advantageously produced in the form of at least one layer made of flexible PVC or of at least one layer made of polyurethane, in particular of a crosslinked and solidified polyurethane dispersion, and/or a middle layer made of optionally foamed flexible PVC or of optionally foamed polyurethane is advantageously introduced between the upper layer and the supportive layer for bonding thereof, and/or during the bonding of upper layer and supportive layer, the middle layer is to some extent advantageously introduced or, respectively, pressed into the supportive layer, and/or an adhesive layer is used to bond the upper layer to the supportive layer, and/or the upper layer advantageously has adhesive properties and is advantageously applied to the supportive layer and is advantageously bonded thereto.

The cavities are preferably formed with a round, elliptical, rod-shaped or star-shaped cross section.

For the strength of the material and for adequate passage of air and of water vapor, the cavities are advantageously formed with a largest dimension in the surface of the upper layer of from 40 μm to 20 mm, preferably from 80 μm to 0.90 mm, and/or per unit of area, for example for each $cm^2$, cavities are advantageously provided to at most 35%, preferably at most 28%, of the unit of area. This avoids impairment of the strength of the composite material.

The procedure here is such that the selection and the dimensions of the cavities are such that the water vapor transmission of the composite material in accordance with DIN EN ISO 14268 is greater than 1.2 $mg/cm^2h$.

For practical operations and/or processing, the composite of upper layer and supportive layer is advantageously produced or, respectively, formed in the form of webs or sheets, and the webs or sheets have then advantageously been divided into cut-to-size sections of desired shape and dimension, and the cavities are advantageously formed by laser treatment in the cut-to-size sections of composite material.

It is possible to achieve a colored design of the cut-to-size sections if, in addition to the cavities penetrating the entire thickness of the upper layer, additional cavities are formed in the upper layer and do not penetrate the entire thickness of the upper layer but instead terminate in the layer situated underneath the uppermost layer of the upper layer. If the individual layers of the upper layer can comprise color pigments of different color, a multicolor pattern is produced.

The procedure of the invention permits particularly cost-effective production of articles which can be produced at least to some extent by using a composite material of the invention. After the composite material of the invention has been produced, i.e. the composite of upper layer and supportive layer has been produced, it is divided into cut-to-size sections, i.e. cut-to-size sections of desired dimensions, and these sections are subjected to the laser treatment, i.e. production of the required number of cavities is delayed until these cut-to-size sections are available. The previous requirement for acceptance of a stereotypically repetitive or regular arrangement of the cavities therefore no longer applies; the cavities can be produced in almost any desired shape and arrangement by means of a commercially available laser provided with an appropriate control unit. The arrangement of the cavities can be adjusted as appropriate for the respective intended purpose. An especial advantage of the cavities produced by means of a laser is that the cavities do not reclose in the manner of cavities produced by needles, because the required quantity of material has been ablated by the laser. The laser-treated areas are moreover smooth, and the susceptibility of the material to soiling is thus reduced. It is also advantageous, after the laser treatment, then to apply a thin finish layer, for example a PVC layer or PU layer, with thickness less than 0.010 mm, to the upper layer.

It is by way of example possible to arrange, per $cm^2$ of a cut-to-size section, 20 cavities with diameter 0.4 mm, 60% of which penetrate the entire thickness of the upper layer. The water vapor transmission provided by this type of design is 1.2 $mg/cm^2h$ in accordance with DIN EN ISO 14268. The threshold value of 1 $mg/cm^2h$ prescribed by the automobile industry is thus exceeded.

Another possibility by way of example in a use of cut-to-size sections for automobile seats is formation of 48 cavities in each $cm^2$, the diameter of each aperture being 0.1 mm. If in turn 60% of the cavities penetrate the entire thickness of the upper layer, extending into the polymer-free region of the supportive layer, the resultant water vapor transmission is 2.1 $mg/cm^2h$.

If 64 cavities/$cm^2$ with diameter 0.020 mm to 0.080 mm are formed in a cut-to-size section with a distribution factor of about 1:1 and with 60% of the cavities penetrating the entire thickness of the upper layer, the resultant water vapor transmission is 1.7 $mg/cm^2h$.

For a seat area, in particular for a middle web, of an automobile seat measuring 40×40 cm, about 6 cavities/$cm^2$ are formed. If the size of the respective cavities is appropriate, sufficiently high air transmission and water vapor transmission is thus readily provided without any disadvantageous effect on the strength of the composite material.

The water vapor transmission is predominantly determined by the upper layer, because the supportive layers used have high air transmission and/or water vapor transmission, while the upper layer is impermeable to air and water vapor.

The tensile strength and tensile strain at break, and the flexural stiffness, of the cut-to-size sections formed in the invention from the composite material are the same, after the laser treatment, as those of the material before the laser treatment because, unlike in needling and/or perforation, the carrier is not weakened.

Figure 1:
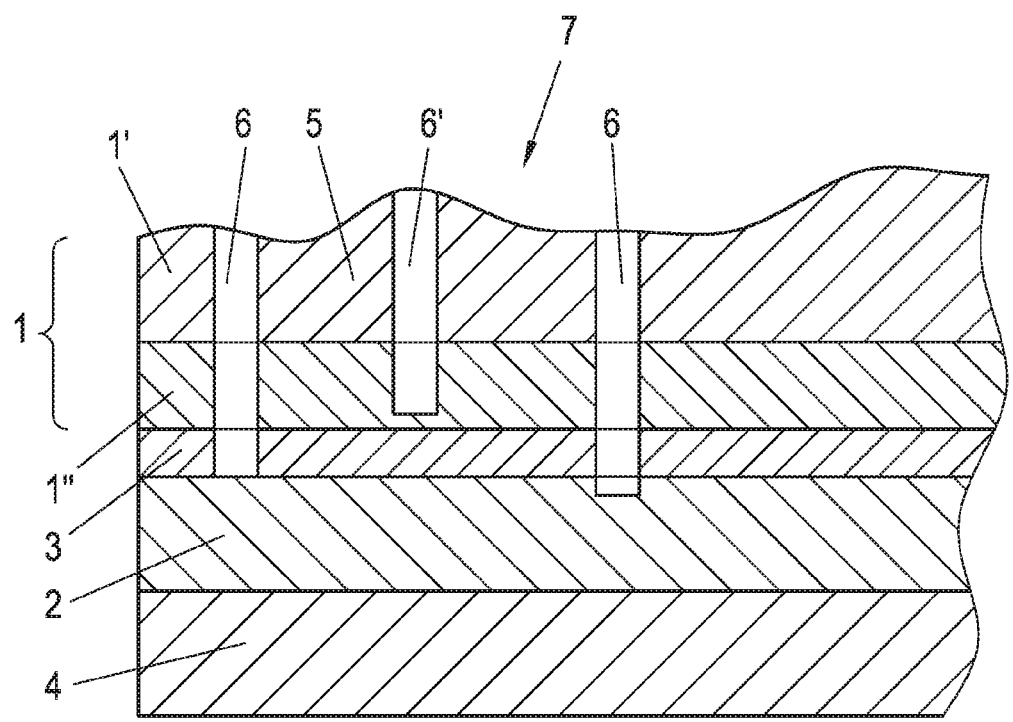
FIG. 1 is a diagram of a cross section through a cut-to-size section of the invention.

FIG. 1 is a diagrammatic section through a cut-to-size section 7 which has an upper layer 1 which is made of flexible PVC or of polyurethane and which has been bonded to a supportive layer 2. The bonding of these layers 1 and 2 can be achieved either directly or, as depicted in FIG. 1, by way of a middle layer 3. The supportive layer 2 can have been bonded to a further layer 4 that provides additional volume or is voluminous. The upper layer 1 can, as depicted, comprise a plurality of layers; two layers 1', 1" are depicted. The layers 1', 1", 2 and/or 3 can be of different color or can have been doped with different color pigments. It is possible that the externally situated layer 1' of the upper layer 1 is compact and is at least one layer made of flexible PVC, and that the internally situated layer 1" of the upper layer 1 is at least one layer made of foamed flexible PVC, or that the externally situated layer 1' of the upper layer 1 is compact and is at least one layer made of polyurethane, in particular one layer made of a crosslinked and solidified polyurethane dispersion, and that the internally situated layer 1" of the upper layer 1 is at least one layer made of foamed polyurethane.

Cavities 6 have been introduced into the upper layer 1, starting from the surface of the upper layer 1. For this purpose, a laser is used to ablate the appropriate quantity of material of the upper layer 1 and of the optionally present middle layer 3. The penetration depth is prescribed via the energy of the laser. A given energy of the laser provides a particular penetration depth. In the region of elevations 5 of the type present by way of example in a grained or embossed upper layer 1, a number of cavities 6' may not penetrate the entire thickness of the upper layer 1, or may extend only into the middle layer 3. However, cavities 6' of this type can serve to form a pattern, in particular if the color of the layer 1" differs from the color of the layer 1'. However, the number of cavities 6 penetrating the entire thickness of the upper layer 1 should be at least 50% of all of the cavities produced.

In particular if the surface of the upper layer 1 is flat, the laser can be controlled so that it provides not only the desired number of cavities 6 penetrating the entire thickness of the upper layer 1 but also additional cavities 6' for the formation of an optionally colored pattern.

Figure 2:
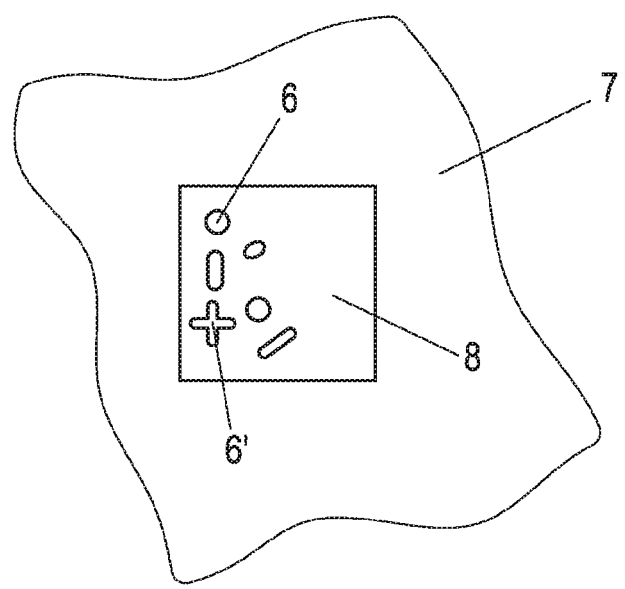
FIG. 2 shows a detail.

FIG. 2 is a diagram of various possible designs of the cavities 6 and 6'. The cross section of the cavities 6, 6' can have a very wide variety of geometric shapes that can be replicated by the laser, and that can optionally be arranged in zones.

FIG. 2 moreover indicates a unit 8 of area of a cut-to-size section 7, the intention being not to exceed a certain number of cavities 6 within said unit. The intention is to select the number of cavities 6 per unit 8 of area in a manner such that no more than 35% of the area of the unit of area is occupied by the cavities 6.

Figure 3:
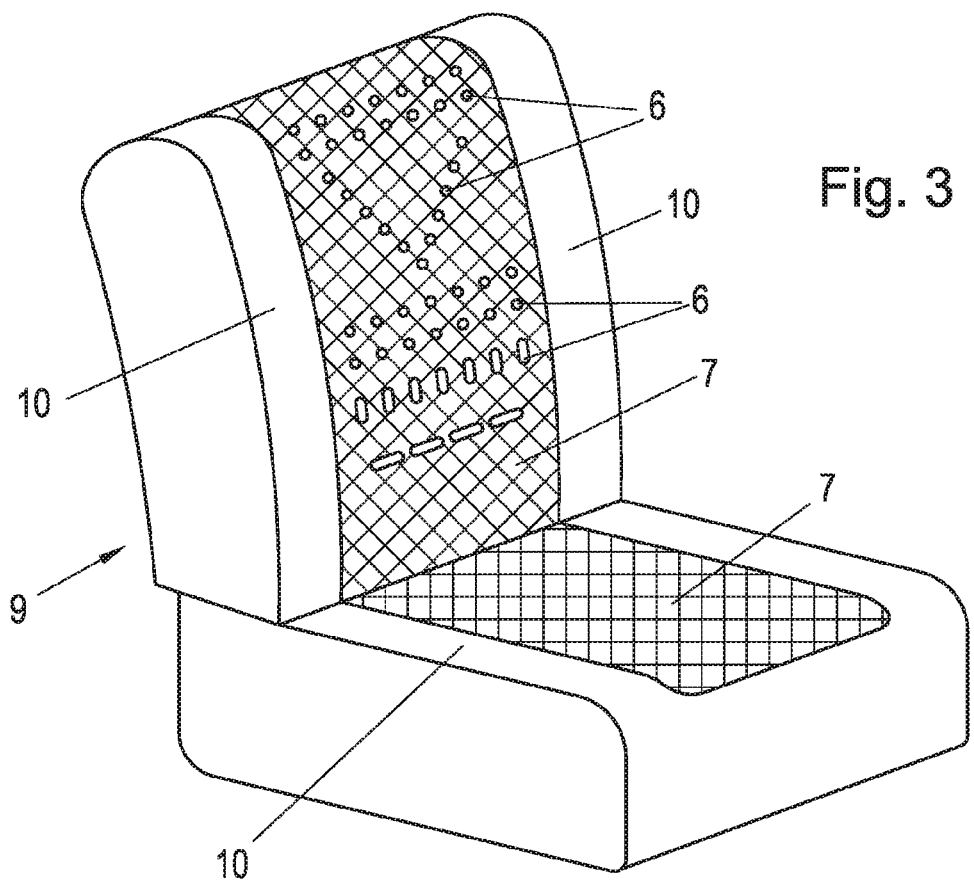
FIG. 3 shows the use of a cut-to-size section in an automobile seat.

FIG. 3 shows an automobile seat produced with a cut-to-size section 7 cut to size from a composite material, where cavities 6 have been provided in the manner of the invention to the cut-to-size section. The dimensions of the cavities 6 depicted are not to scale but are merely illustrative. Cut-to-size sections 7 of this type are laser-treated after they have been cut to size from the composite material comprising upper layer 1 and supportive layer 2, to give the prescribed shape. These cut-to-size sections 7 provided with the cavities 6 are then bonded, e.g. stitched or adhesive-bonded, to other materials 10, e.g. fabrics or synthetic leather, which mostly have no cavities 6 and by way of example are used or incorporated in the lateral regions of the automobile seat.

Figure 4:
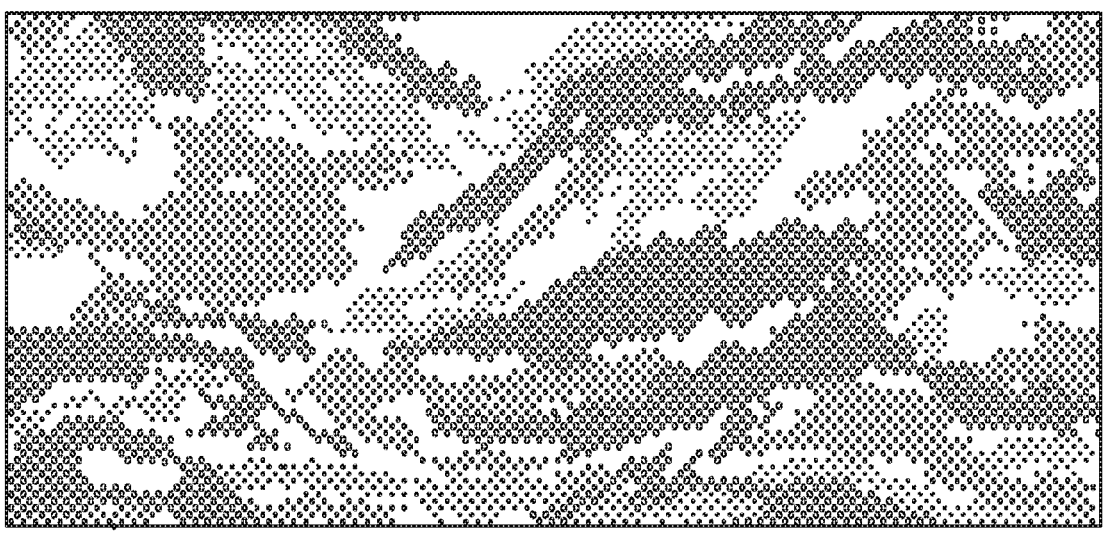
FIG. 4 is a plan view of a cut-to-size section provided with cavities of different dimensions.

FIG. 4 is a plan view of a surface belonging to a cut-to-size section 7 and provided with cavities 6. The cavities 6 have different dimensions and have irregular distribution or are assembled into groups in a manner that produces a patchwork pattern.

The cavities 6 and 6' can have various geometric shapes. They can follow a surface structure, or can be arranged as an image. In the case of the image-type arrangement of FIG. 4, there are zones present with cavities 6 of different diameters and also small zones present in which there are no cavities 6 and/or 6' arranged.

The laser treatment takes place in a commercially available laser engraving system. The vapors, e.g. hydrochloric acid in the case of PVC, are removed by suction directly where they arise; the vapors are passed into a water container and neutralized.

For the construction of the composite material, the largest dimension of the cavities in the surface of the upper layer 1 is advantageously from 40 µm to 2.0 mm, preferably from 80 µm to 0.90 mm, and/or per unit of area, e.g. per $cm^2$, advantageously at most 35%, preferably at most 28%, of the area of said unit of area is occupied by cavities 6. The invention therefore achieves a water vapor transmission of the composite material in accordance with DIN EN ISO 14268 that is greater than 1.2 $mg/cm^2h$.

Air transmission and/or water vapor transmission by way of the surface of a cut-to-size section 7 can easily be adjusted to desired values via selection of the cavities 6 and their diameter, without impairing the strength of the material.

The upper layer 1 is advantageously composed of two layers 1', 1". The layers 1', 1" can have been constructed from a plurality of layers made of the respective material.

We claim:

1. A process for the production of a composite material, the process comprising:
    forming a composite material comprising a supportive layer and an upper layer, wherein the supportive layer is a textile material selected from a woven fabric, a knitted fabric, a nonwoven microfiber fabric, or a leather, and wherein the upper layer is comprised of individual layers comprising at least two polyurethane (PU) layers or at least two flexible polyvinyl chloride (PVC) layers bonded to one another, and wherein each of the individual layers is doped with a different visually distinguishable color pigment;
    pressing a middle layer between the supportive layer and the upper layer, wherein the middle layer consists of foamed flexible PVC, foamed PU, or high-solids PU;
    ablating the composite material with a laser proceeding from a surface of the upper layer to form channel-shaped cavities for the passage of water vapor and/or air, wherein at least some of the channel-shaped cavities penetrate an entire thickness of the upper layer and/or terminate before entry into a region of volume of the supportive layer that is free from the upper layer, thereby fusing the individual layers of the upper layer to one another in a region surrounding the channel-shaped cavities,
    applying a finish layer comprised of PVC or PU having a thickness of less than 0.010 mm to the upper layer after ablating; and
    removing any residual polymer vapors from the composite material by applying suction directly where they arise from the cavities and neutralizing the vapors,
    wherein the channel-shaped cavities are formed with a largest dimension in a surface of the upper layer of from 40 µm to 0.90 mm;
    wherein the cavities form a patchwork pattern,
    wherein, per unit of area, the channel-shaped cavities are provided to at most 35% of the unit of area; and,
    wherein an adhesive or adhesive layer is not present between a surface of the upper layer immediately adjacent to and contacting the middle layer, and between a further surface of the middle layer immediately adjacent to and contacting the support layer.

2. The process as claimed in claim 1, wherein at least 50% of the channel-shaped cavities formed penetrate the entire thickness of the upper layer and extend at least as far as the supportive layer.

3. The process as claimed in claim 1, wherein the composite material is produced with a thickness of from 1.0 to 1.4 mm.

4. The process as claimed in claim 1, wherein the layers of the upper layer further comprise at least one layer comprised of crosslinked and solidified polyurethane dispersion.

5. The process as claimed in claim 1, wherein pigments of different colors are also added to the middle layer introduced between the upper layer and the supportive layer.

6. The process as claimed in claim 1, wherein the channel-shaped cavities are formed with a round, elliptical, rod-shaped or star-shaped cross section.

7. The process as claimed in claim 1, wherein the channel-shaped cavities are formed with a largest dimension in a surface of the upper layer of from 80 µm to 0.90 mm.

8. The process as claimed in claim 1, wherein, per unit of area, the channel-shaped cavities are provided to at most 28%, of the unit of area.

9. The process as claimed in claim 1, wherein selection and dimensions of the channel-shaped cavities are such that the water vapor transmission of the composite material in accordance with DIN EN ISO 14268 is greater than 1.2 $mg/cm^2h$.

10. The process as claimed in claim 1, wherein the supportive layer is bonded to a voluminous base layer comprising a nonwoven fabric.

11. The process as claimed in claim 1, wherein the composite material formed of the upper layer and the supportive layer is produced or, respectively, formed in the form of webs or sheets, and that the webs or sheets have then been divided into cut-to-size sections of desired shape and dimension, and the channel-shaped cavities are formed by laser treatment in the cut-to-size sections of the composite material.

12. A composite material comprising:
    a supportive layer, comprising a woven fabric, knitted fabric, nonwoven microfiber fabric, or a leather,
    an upper layer comprising bonded to one another individual layers comprising at least two polyurethane (PU) layers or at least two flexible polyvinyl chloride (PVC) layers, wherein each of the individual layers is doped with a different visually distinguishable color pigment,
    a middle layer positioned between the supportive layer and the upper layer consisting of foamed flexible PVC, foamed PU, or high-solids PU, and
    a finish layer applied to the upper layer comprised of PVC or PU and having a thickness of less than 0.010 mm,
    wherein in the composite material comprises, proceeding from a surface of the upper layer, channel-shaped cavities for the passage of water vapor and/or air that are produced by, or formed by, a laser, and wherein the cavities form a patchwork pattern;

wherein during the formation of the channel-shaped cavities, the individual layers of the upper layer are bonded or, respectively, fused to one another by the laser in the region surrounding the channel-shaped cavities;

wherein at least some of the channel-shaped cavities penetrate an entire thickness of the upper layer and/or terminate before entry into a region of a volume of the supportive layer that is free from the upper layer;

wherein the channel-shaped cavities are formed with a largest dimension in a surface of the upper layer of from 40 μm to 0.90 mm;

wherein, per unit of area, the channel-shaped cavities are provided to at most 35% of the unit of area; and, wherein an adhesive or an adhesive layer is not present between a surface of the upper layer immediately adjacent to and contacting the middle layer, and between a surface of the support layer immediately adjacent to and contacting the middle layer.

13. The composite material as claimed in claim 12, wherein at least 50% of the channel-shaped cavities formed penetrate an entire thickness of the upper layer and extend at least as far as the supportive layer.

14. The composite material as claimed in claim 12, wherein, during formation of the channel-shaped cavities, layers in contact with one another or following one another, made of flexible PVC, or layers made of polyurethane of the upper layer are bonded or, respectively, fused to one another in a region surrounding the channel-shaped cavities.

15. The composite material as claimed in claim 12, wherein thickness of the composite material is from 1.0 to 1.4 mm.

16. The composite material as claimed in claim 12, wherein
an externally situated layer of the upper layer is compact and is at least one layer made of flexible PVC, and that an internally situated layer of the upper layer is at least one layer made of foamed flexible PVC, or
an externally situated layer of the upper layer is compact and is at least one layer made of a crosslinked and solidified polyurethane dispersion, and that an internally situated layer of the upper layer is at least one layer made of foamed polyurethane.

17. The composite material as claimed in claim 12, wherein a cross section of the channel-shaped cavities is round, elliptical, rod-shaped or star-shaped.

18. The composite material as claimed in claim 12, wherein a largest dimension of the channel-shaped cavities in the surface of the upper layer is from 80 μm to 0.90 mm.

19. The composite material as claimed in claim 12, wherein per unit of area, at most 28%, of the area of the unit of area is occupied by cavities.

20. The composite material as claimed in claim 12, wherein the water vapor transmission of the composite material in accordance with DIN EN ISO 14268 is greater than 1.2 mg/cm$^2$h.

21. The composite material as claimed in claim 12, wherein the supportive layer has been bonded to a voluminous base layer comprising a nonwoven fabric.

22. The composite material as claimed in claim 12, wherein the composite material takes the form of a cut-to-size section or has been cut to size or divided.

23. An article at least to some extent produced with a cut-to-size section made of the composite material as claimed in claim 12, in particular a motor vehicle seat cover or motor vehicle seat cushioning, motor vehicle headrest, shoes or a reclining area.

24. A cut-to-size section produced from a composite material as claimed in claim 12.

25. The process as claimed in claim 1, wherein:
a) the composite material comprises 20 cavities per cm$^2$, each cavity having a diameter of 0.4 mm, wherein 60% of the cavities penetrate through the upper layer to the supportive layer, and has a water vaper transmission according to DIN EN ISO 14268 of 1.2 mg/cm$^2$h,
b) the composite material comprises 48 cavities per cm$^2$, each cavity having a diameter of 0.1 mm, wherein 60% of the cavities penetrate through the upper layer to a polymer-free region of the supportive layer, and has a water vaper transmission according to DIN EN ISO 14268 of 2.1 mg/cm$^2$h, or
c) the composite material comprises 64 cavities per cm$^2$, each cavity having a diameter of 0.020 mm to 0.080 mm, with a distribution factor of about 1:1, wherein 60% of the cavities penetrate through the upper layer to at least the middle layer, and has a water vaper transmission according to DIN EN ISO 14268 of 1.7 mg/cm$^2$h.

26. The composite material of claim 12, wherein:
a) the composite material comprises 20 cavities per cm$^2$, each cavity having a diameter of 0.4 mm, wherein 60% of the cavities penetrate through the upper layer to the supportive layer, and has a water vaper transmission according to DIN EN ISO 14268 of 1.2 mg/cm$^2$h,
b) the composite material comprises 48 cavities per cm$^2$, each cavity having a diameter of 0.1 mm, wherein 60% of the cavities penetrate through the upper layer to a polymer-free region of the supportive layer, and has a water vaper transmission according to DIN EN ISO 14268 of 2.1 mg/cm$^2$h, or
c) the composite material comprises 64 cavities per cm$^2$, each cavity having a diameter of 0.020 mm to 0.080 mm, with a distribution factor of about 1:1, wherein 60% of the cavities penetrate through the upper layer to at least the middle layer, and has a water vaper transmission according to DIN EN ISO 14268 of 1.7 mg/cm$^2$h.

* * * * *